United States Patent [19]

Stentiford et al.

[11] Patent Number: 5,765,131
[45] Date of Patent: *Jun. 9, 1998

[54] LANGUAGE TRANSLATION SYSTEM AND METHOD

[75] Inventors: Frederick W. Stentiford, Woodbridge; Martin G. Steer, Ipswich, both of England

[73] Assignee: British Telecommunications public limited company, London, England

[*] Notice: The term of this patent shall not extend beyond the expiration date of Pat. No. 5,384,701.

[21] Appl. No.: 377,599

[22] Filed: Jan. 24, 1995

Related U.S. Application Data

[63] Continuation-in-part of Ser. No. 711,703, Jun. 7, 1991, Pat. No. 5,384,701, which is a continuation of Ser. No. 201,120, Jun. 2, 1988, abandoned.

[30] Foreign Application Priority Data

| | | | |
|---|---|---|---|
| Oct. 3, 1986 | [GB] | United Kingdom | 8623839 |
| May 1, 1987 | [GB] | United Kingdom | 8710376 |
| Sep. 29, 1987 | [WO] | WIPO | PCT/GB87/00683 |

[51] Int. Cl.$^6$ .................................................. G10L 5/06
[52] U.S. Cl. ............................ 704/277; 704/235; 704/257; 704/260
[58] Field of Search ..................... 379/67, 84, 88, 379/89, 37; 364/900, 513.5, 419, 419.03; 340/711; 395/2.66; 704/257, 2, 3, 4, 8, 277, 235, 260

[56] References Cited

U.S. PATENT DOCUMENTS

| | | | |
|---|---|---|---|
| 4,333,152 | 6/1982 | Best | 364/513.5 |
| 4,412,305 | 10/1983 | Yoshida | 364/419 |
| 4,481,607 | 11/1984 | Kobayashi et al. | 364/900 |
| 4,488,005 | 12/1984 | Frantz | 379/37 |
| 4,503,426 | 3/1985 | Mikulski | 340/711 |

(List continued on next page.)

FOREIGN PATENT DOCUMENTS

| | | |
|---|---|---|
| 873458 | 5/1979 | Belgium. |
| 0032062 | 2/1984 | Japan. |
| 60-200369 | 10/1985 | Japan. |
| 1508741 | 1/1976 | United Kingdom. |
| 2014765 | 8/1979 | United Kingdom. |
| 2113048 | 7/1983 | United Kingdom. |

OTHER PUBLICATIONS

Miller, "Talking Terminals and Listening Computers Overcome Toy Image." *Infosystems*, Oct. 1980, pp. 50–56.

Mori, *Patent Abstracts of Japan*, vol. 9, No. 186, (P377), Abstract No. 60–55434, undated.

Mizoguchi, *Patent Abstracts of Japan*, vol. 10, No. 387, Abstract No. 61-175858, undated.

"Machine Translation: Historical Background" by the Department of the Secretary of State, Canada, Chapter 5 (publication date unknown).

A. Neijt, "Esperanto as the Focal Point of Machine Translation," *Multilingua 5-1* (1986), pp. 9–13.

(List continued on next page.)

*Primary Examiner*—Krista Zele
*Assistant Examiner*—Scott Wolinsky
*Attorney, Agent, or Firm*—Nixon & Vanderhye P.C.

[57] ABSTRACT

A language translation system for translating phrases from a first language into a second language comprises a store holding a collection of phrases in the second language. Phrases input in the first language are each characterized on the basis of one or more keywords, and the corresponding phrase in the second language is output. Such a phrasebook approach enables what is effectively rapid and accurate translation, even from speech. Since the phrases in the second language are prepared in advance and held in store, there need be no problems of poor translation or ungrammatical construction. The output may be in text, or, using speech synthesis, in voiced form. With appropriate choice of keywords it is possible to characterize a large number of relatively long and complex phrases with just a few keywords.

11 Claims, 1 Drawing Sheet

U.S. PATENT DOCUMENTS

| | | | |
|---|---|---|---|
| 4,507,750 | 3/1985 | Frantz et al. | 395/2.86 |
| 4,525,793 | 7/1985 | Stackhouse | 364/513.5 |
| 4,593,356 | 6/1986 | Hashimoto et al. | 364/419 |
| 4,597,055 | 6/1986 | Hashimoto et al. | 364/900 |
| 4,623,985 | 11/1986 | Morimoto et al. | 364/419 |
| 4,630,235 | 12/1986 | Hashimoto et al. | 364/900 |
| 4,797,910 | 1/1989 | Daudelin | 379/67 |
| 5,199,062 | 3/1993 | Von Meister et al. | 379/67 |

OTHER PUBLICATIONS

Krutch, "Experiments in Artificial Intelligence for Small Computers," Howard W. Sams & Co., Inc., 1981, pp. 85–105.

Raphael, *The Thinking Computer: Mind Inside Matter*, 1976, W.H. Freeman & Company, pp. 194–195.

Barr et al., *The Handbook of Artificial Intelligence vol. I*, 1981, William Kaufmann, Inc., pp. 282–291.

Allen B. Tucker, Jr., *Communications of the ACM*, Apr. 1984, vol. 27, No. 4, "A Perspective on Machine Translation Theory and Practice".

Green et al., 1963, "BASEBALL, An Automatic Question Answerer," Feigenbaum, E.A. and Feldman, J. (Eds.), 1963 *Computers and Thought*, pp. 207–16, New York, McGraw-Hill.

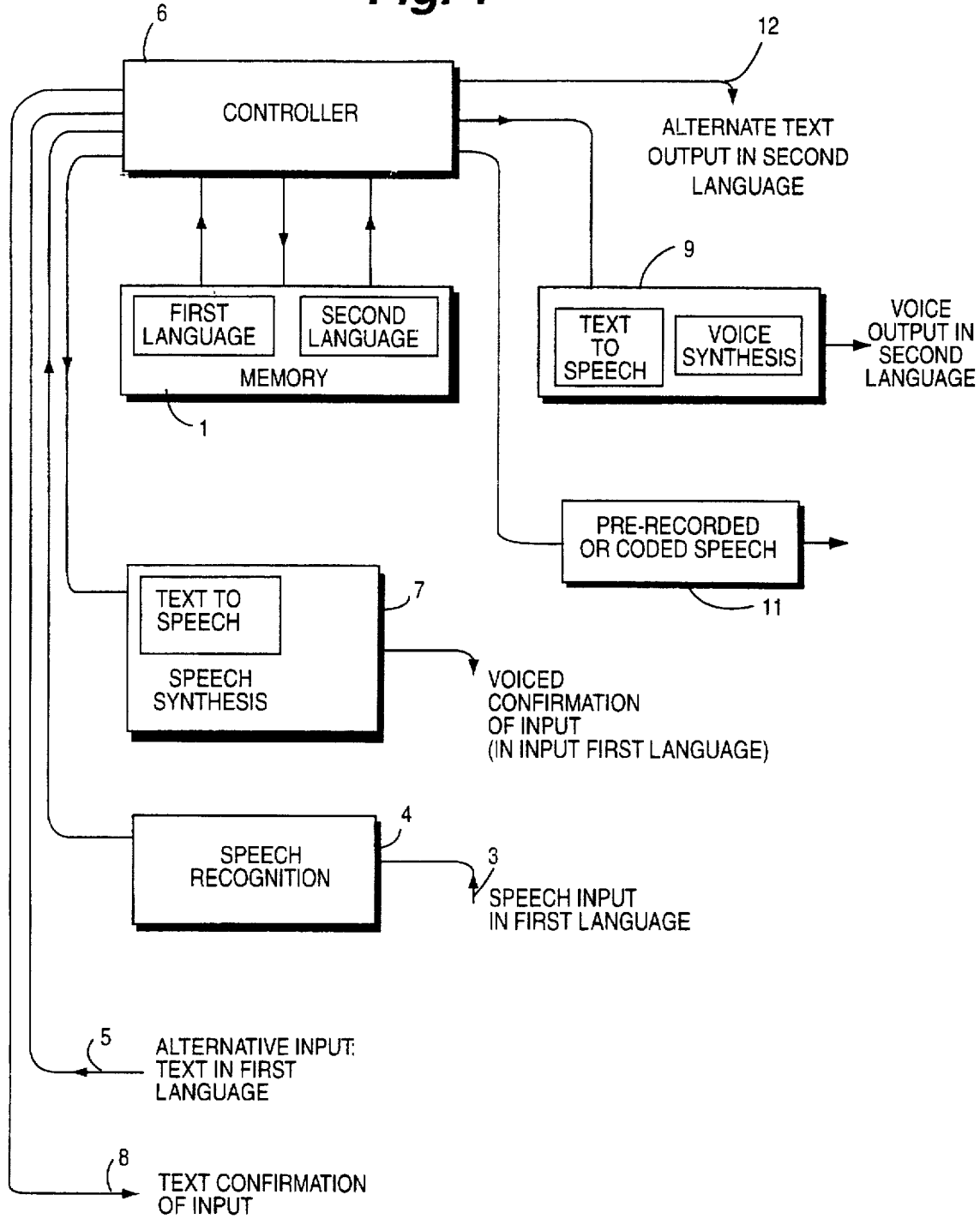

LANGUAGE TRANSLATION SYSTEM AND METHOD

This is a continuation-in-part application of application Ser. No. 07/711,703 filed 7 Jun., 1991, issued as U.S. Pat. No. 5,384,701 on Jan. 24, 1995, which is a continuation application of application Ser. No. 07/201,120, filed 2 Jun., 1988, now abandoned.

FIELD OF THE INVENTION

This invention relates to a system for producing speech in response to an input phrase.

BACKGROUND OF THE INVENTION

A machine which can rapidly and automatically recognize speech and provide an associated response, has been sought for many years. However, even with the tremendous progress in computing, speech recognition and speech synthesis in recent years, such machines remain the stuff of dreams and fiction.

Considerable research has been carried out on computer systems to respond automatically to spoken input. The problems are compounded by the errors of speech recognition, the additional information in intonation, stress, etc., and the inexactness of speech itself.

Unfortunately, existing voice-driven packages are all deficient in some way or another and do not meet the practical requirements for such systems. Most such packages produce outputs which have to be post-edited before being presentable. Most packages are either menu-driven and interactive or operate in a slow batch processing mode, neither of which is suitable for "real-time" speech operation. Such packages also tend to be unreliable, as idioms and other exceptions can easily cause erroneous output: the user has no guarantee that the output will be correct. Existing systems are also very CPU intensive, making them expensive to run and hence unsuitable for many cost sensitive applications.

SUMMARY OF THE INVENTION

The present invention seeks to provide a system in which these deficiencies and disadvantages are mitigated. According to the present invention, there is provided a system comprising input means for accepting an input phrase;

a store holding a collection of phrases;

characterization means connected to the input means for determining which phrase of the collection is associated with the input phrase; and output means responsive to the characterization means for outputting the determined phrase;

wherein the characterization means includes means for identifying in the input phrase the presence of at least one keyword of a predetermined set of keywords, and to select in dependence or the recognized keyword(s) a stored phrase from the collection.

Such a system provides very quick recognition, the time required being that to identify/characterize the input phrase and that to look up the 'answer' in the stored phrases.

The stored phrase can give the user providing the input confirmation that she/he has been recognized/understood correctly by the system, which is, of course, particularly important in speech systems.

Once it has beer confirmed to the user that his message has been correctly characterized, accuracy or operation is ensured.

The system also makes possible rapid operation in several languages; essentially, all that need be added are further stores holding collections of phrases in each of the additional languages.

BRIEF DESCRIPTION OF THE DRAWING

Embodiments of the invention will now be described with reference to the accompanying drawings in which:

FIG. 1 is a block diagram showing the principal components of a system according to the invention.

DETAILED DESCRIPTION OF EXAMPLE EMBODIMENTS

The apparatus has a first store 1, in which are stored a repertoire of phrases. Input speech signals in use are supplied to an input 3 and thence to a speech recognizer 4—or, alternatively, text may be input at an input 5, e.g. from a keyboard (not shown).

The present invention is based on our appreciation that it is possible to characterize and capture the semantic content of a large number of distinct phrases by means of keywords.

Characterization means are provided in the form of a controller 6, which , may, for example, be a computer such as the IBM PC XT. This determines the correspondence of phrases on the basis of presence in the input phrase of keywords, using a keyword list (the generation of which is described below). With appropriate selection of the keywords, it is possible to use existing, commercially available speech recognizers, which are only capable of recognizing considerably fewer words than would be contained in a usefully large set of phrases, to characterize and differentiate a large set of phrases.

When the controller 6 has identified the phrase, it indicates to the user which of the phrases in the first store it deems to have recognized via a speech synthesizer 7 or text output 8. This is confirmed with the user (the recognizer 4 can also recognize system control words) and the controller 6 then outputs a control signal for further action. Alternatively, further pre-recorded or coded speech may be output (11) or text may be output (output 12).

In order to generate the keyword list, a keyword extraction process is followed, as will now be described.

The performance of the system as a whole therefore rests on the ability of those keywords to correctly distinguish between phrases. The greater the separation of phrases achieved, the greater the system's tolerance to recognition errors and also discrepancies introduced by the speaker himself.

The Selection of Keywords

A suitable search procedure is as follows:

1. Order each of the K words in the N phrases of interest, according to the word's frequency of occurrence in the phrases.
2. Select the M most frequently occurring words as the initial keyword list, where M is the number of words in the vocabulary of the speech recognizer.
3. The presence or absence of each keyword in each phrase is then determined. The number of phrases (E) which are not distinguished by the keywords are counted.
4. Let i=1.
5. A keyword is temporarily deleted from the list and the new value (E') of E is computed.
6. The score E'–E is assigned to the keyword which was temporarily deleted; this being a measure of worsening of the performance after the renewal of the keyword, and hence its contribution to the overall performance. [In effect, this measure is used to ensure that each keyword contributes to the separation of as many phrase pairs as possible, but without simply duplicating the function of others].

7. Temporarily deleted keywords are replaced and the process is repeated for each of the M keywords.
8. The word with the lowest score is removed from the current keyword list.
9. The $M+i^{th}$ most frequent word is then used to replace the removed word, and then a new E is calculated.
10. If the new F indicates an improved performance over the previous E, then i is incremented and the process is repeated from step 5, unless $M+i>K$, in which case the process stops. Otherwise, the $M+i^{th}$ word is rejected; i is incremented and the process is repeated from step 9, unless $M+i>K$, in which case the word last removed in step 8 is replaced and the process stops.

The final keyword list contains the optimal set of M single keywords for phrase identification.

Further iterations, starting with the best M words from the previous iteration, may yield further improvements in phrase separation. Heuristics, other than frequency ordering, may be used to provide the succession or candidate words in step 1, especially if a priori linguistic information is available. In addition, it is likely that the words towards the bottom of the occurrence list will not appreciably aid separation of phrases, and it may, therefore, not be worth searching through more than say the upper third or upper half of the occurrence list.

It is sometimes the case that most phrases are distinguished and E becomes very close to zero quite early in the search. Further improvements are obtained in these cases by computing E on the basis that phrases are only considered distinguished if more than one keyword is different. This ensures that most phrases are separated by more than a minimum number of keywords and provides some immunity to speech recognition errors.

During the search, it becomes clear that several classes of phrase are never going to be separated unless the keyword vocabulary is extended. These "clusters" or groups of phrases tend to differ only by a single word or subordinate string of words (e.g. dates in business letters) and are candidates derived automatically for use in the preparation of keyword subvocabularies (detailed below).

It is apparent that the recognition of single keywords takes no account of word order and the additional meaning that it may contain. The presence or otherwise of key pairs (or other multiples) of words with various separations between them can, therefore, also he used to improve the effectiveness of the single keyword set. This has the advantage in speech recognition that the performance may be improved without increasing the recognition vocabulary. In a text application, further improvements can be obtained by generalizing the keywords to include punctuation, parts of words, and combinations of words and parts of words, e.g. "-ing * bed" (where * can be any words) would be present in "making the bed" and "selling a bed".

The use of pairs of keywords (e.g. we * * to) enhances the value of the component single words if further phrase confusions are resolved. The search for word pairs which are not necessarily contiguous but separated by different numbers of other words, again begins with the preparation of a frequency ordering. Word pairs with both component words in the M keywords are made from the ordered list if they resolve any remaining phrase confusions. The final list of single keywords and pairs of keywords are each scored as before and an overall phrase confusion score E computed.

The search now begins for better performing word pairs, where one or both of the component keywords are not in the current keyword list. The next word pair candidate is taken from the top of the frequency ordering and appended to the keyword list. The single keywords in the appended word pair, which are not already present are also added and an equal number of the worst performing single keywords deleted. This may cause other word pairs to be deleted if their component words are no long present. A new value (E') of E is computed. If an improvement is obtained and E'<E, the most recent modifications of the keyword list are retained, otherwise the list is restored to its previous state. Further word pairs are processed from the frequency ordering, although as with the single keyword search, other heuristics may be used to provide candidate word pairs.

It is worth observing that some keyboards contribute more to the overall performance through their participation in several word groups than by themselves.

The method extends to larger keyword groupings (>2 words) but, as the frequency of occurrence decreases, the contribution to the resolution of phrase confusions are only significant in a very large corpus of phrases.

The quantity of computation involved in the search for keywords increases with the number of keywords and the number of phrases. This may be reduced by first running the algorithm on a subset of phrases which are confused or very close to being confused. The keywords and their scores so obtained provide a more efficient ordering of candidate keywords to the main algorithm, which will work with a more complete set of phrases.

In a speech recognition application, some words which are not in the keyword set can generate many spurious keyword recognitions, e.g. occurrences of the word "I" may be always recognized as the keyword "by". If, however, the groups of confused words are considered as synonymous before the search for keywords begins and in the subsequent phrase identification, the actual phrase separations should not be affected by this problem. Furthermore, because of the frequency of such synonymous words taken together is necessarily higher than that of the separate words, a greater quantity of phrasal information is normally associated with their detection.

The use of keywords may be extended to keyword-parts (e.g. phonemes), which occur again with higher frequency and which bear more phrase distinguishing information than the whole words. Moreover, the identification of certain word-parts part in continuous speech is often easier than complete words and is, therefore, preferable in a system which accepts continuous speech input. Throughout this specification, the word "keyword" is for the sake of brevity used to refer to both whole keywords and to parts of keywords.

Many classes of phrase only differ from each other in subordinate phrases and clauses which may contain details of dates, times, prices, items, names or other groups of words. It may be that the vocabulary of a speech recognizer is sufficient to assign a phrase to a particular class or group of phrases but is not large enough to hold sufficient keywords to separate the subordinate structures. Furthermore, it is quite possible that the total vocabulary required to separate the phrase classes and the subordinate structure contains many more words which are easily confused. This means that, even if the capacity of the recognizer was sufficient to cover the whole vocabulary, the performance would be too low to obtain reliable phrase and subordinate phrase identification. It is an advantage of the method, according to the invention, that the original utterance or some transform of the original utterance may be stored in a buffer and the recognition process may be repeated, once the phrase class, has been determined, using the set of keywords which are expected in the subordinate word strings particular to that phrase class. In this way, the recognition apparatus never has to cope with the total vocabulary, with its many potential word confusions, at once but appears to be the user to do so. It should be noted that the speed of the second recognition process is not limited by the speed of the original utterance and can, in principle, be carried out much faster than real-time and, hence, not necessarily introduce noticeable delays. The iterations of recognition may be carried out as many times as is necessary to identify the required phrase and its substructure. It thus, becomes possible to 'nest' the recognition process, the phrase being characterized in numerous separate stages, the recognizer at each stage drawing on a different vocabulary of keywords.

Many, although not all, subordinate word strings will be context independent in the source language. This is because positions for subordinate word strings are only designated as such if several alternatives are possible, making tight contextual dependence less likely for any one of them In addition, contextual importance would imply that there were dependencies between words which were inside and outside the potential subordinate string and hence there would be scope for keywords to distinguish the whole phrase, without the use of words inside the string. This is illustrated in phrases containing changing dates, in which there is rarely any word change necessary in the phrase, apart from the date itself.

This particular aspect of the invention also has significant benefits when employed for the recognition of text where the computation costs of searching large dictionaries can be reduced dramatically, by using a similar hierarchy of smaller dictionaries and phrasebooks. Some subordinate phrases include terms that do not need to be recognized and often in these cases it would no, in general, be possible to recognize automatically the words in these phrases. The commonest case of this occurs in utterances which make reference to labels, such as proper nouns: e. g. "Can I speak to Mr. Smith please?". As before, the system can identify the phrase class, together with the locations of words, in the buffer which corresponds to the label reference. The processing of such label reference words during recognition is then simply the transmission of the original acoustic Signal in the appropriate place in the output phrase. Clearly it is desirable that the synthesized voice should match the voice of the original speaker and it is a requirement of text-to-speech synthesizers that certain speech parameters can be set so that such matching can be achieved as far as possible (e.g. old/young, male/female).

So that the user can be sure that the correct action will be taken as a result of the input, the system indicates what phrase in the collection of phrases it has determined is associated with the input phrase.

Preferably, in the system the phrases are stored as text in, for example, ASCTT coded form, since that reduces the storage requirement very considerably compared to that needed for conventionally companded or non-companded speech. Where speech output is required, the text is retrieved from store and passed to a text-to-speech converter and speech synthesizer With ASCI, coded text storage, 1 byte per character is needed, which means that about 10,000 phrases could be stored with half a megabyte of storage.

EXAMPLE

A demonstration system, connected to a telephone network, has been run to demonstrate the feasibility of the approach. The demonstration system uses a Votan speech recognizer, an Infovox speech synthesizer and an TBM PC XT computer.

The Votan speech recognizer is capable of recognizing up to 64 continuously spoken words over a telephone network. Allowing for system control words such as "yes", "no", "quit" and "enter", up to 60 words can be chosen to be keywords.

None of the system control words are allowed to appear in the input phrases, so where it is possible, it may be preferable to use control buttons or keys rather than spoken commands.

The store of phrases consists of 400 English phrases and their French equivalents.

The English phrases contain around 1100 different words. To put these numbers in context, a standard phrasebook of business expressions would typically contain this number of phrases.

After running keywod extractions software based on the principles outlined above, 60 keywords were chosen which successfully separated all the phrases. Of the 400 phrases, only 32 were distinguished by just a single word (those 32 phrases being in 16 pairs).

The demonstration system, on recognizing the keyword (s), accesses the appropriate phrase, confirms it (orally) with the user.

It is important to note that text-to-speech synthesis is not essential to this invention. It is quite feasible, indeed advantageous, to synthesize speech from pre-recorded or coded words and phrases. This has the advantage that such speech may be recorded by the user and hence will acoustically natch any embedded speech.

In addition to speech-to-speech, the present invention is, of course, applicable to speech-to-text.

We claim:

1. A language translation system comprising:
   input means for accepting an input phrase consisting of a plurality of words;
   at least one store holding a first collection of phrases in a first language and a second collection of phrases in a second language which correspond to the first collection of phrases;
   characterization means connected to the input means and to the at least one store for determining which phrase of at least one of said first and second collections is associated with the input phrase, the characterization means including means coupled to the at least one store for identifying among the words of the input phrase, the presence of at least one keyword of a predetermined set of keywords, the characterization means being operative in response to the identification of a given keyword or given combination of keywords to select a phrase from said at least one of said first and second collections of phrases; and
   output means responsive to the characterization means for outputting the selected phrase as a confirmatory audio message;
   the system thereafter producing a further output in dependence upon the identity of the selected phrase.

2. A system as in claim 1 wherein the number of members in the set of keywords is smaller than the number of phrases in the collections.

3. A system as claimed in claim 1 wherein the characterization means comprises a speech recognizer.

4. A system as claimed in claim 1, wherein said input means is capable of accepting spoken inputs, and said output means provides voiced outputs.

5. A system as claimed in claim 1 wherein means are provided to enable portions of said input phrase to be passed to said output means for outputting as part of the selected phrase.

6. A system as claimed in claim 1 further comprising a keyboard for providing an input message to said input means, and means to provide a text output.

7. A system as claimed in claim 1 further comprising a further collection of phrases in each of a plurality of second languages.

8. A system according to claim 1, in which each phrase of said collections contain a unique keyword, keyword-part or combination of keywords or keyword-parts.

9. A system according to claim 1 in which the characterization means is operable in the case that more than one keyword is recognized in the input phrase to make use of their relative positions within the input phrase for the purpose of distinguishing between phrases of the collections.

10. A system as claimed in claim 1, in which the characterization means applies a first set of keywords to determine to which phrase or group of phrases, if any, from said collections of phrases the input phrase corresponds, and, in the case that the input phrase is found to correspond to an undetermined one of a group of phrases, the characterization means applies a second set of keywords to determine to which one of the group of phrases the input phrase corresponds.

11. A method of translating multi-word phrases, the method comprising:

accepting an input phrase consisting of a plurality of words;

identifying among the words of the input phrase the presence of at least one keyword of a predetermined set of keywords;

in response to the identification of a given keyword or given combination of keywords in a second language, selecting a phrase from a first collection of phrases in a first language and a second collection of phrases, which correspond to the first collection of phrases;

outputting the selected phrase as a confirmatory audio message; and thereafter producing a further output in dependence upon the identity of the selected phrase.

\* \* \* \* \*